United States Patent [19]

Karklys et al.

[11] 4,453,067
[45] Jun. 5, 1984

[54] INDUCTION HEATING COIL

[75] Inventors: Joseph Karklys, St. Joseph; Mikayel Semerciyan, St. Joseph Township, Berrien County, both of Mich.

[73] Assignee: Whirlpool Corporation, Benton Harbor, Mich.

[21] Appl. No.: 338,667

[22] Filed: Jan. 11, 1982

[51] Int. Cl.³ .............................................. H05B 6/40
[52] U.S. Cl. ........................... 219/10.49 R; 219/10.43; 219/10.79; 336/205; 336/232
[58] Field of Search ...................... 219/10.79, 10.49 R, 219/10.43; 336/205, 223, 232, 84 R

[56] References Cited

U.S. PATENT DOCUMENTS

| | | | |
|---|---|---|---|
| 2,452,197 | 10/1948 | Kennedy | 219/10.79 X |
| 2,751,480 | 6/1956 | Eisen | 219/10.79 X |
| 3,275,784 | 9/1966 | Merrett | 219/10.79 X |
| 3,632,948 | 7/1970 | Moulin | 219/10.79 |
| 3,819,903 | 6/1974 | Frick | 219/464 |
| 3,843,857 | 10/1974 | Cunningham | 219/10.49 R |
| 4,029,926 | 6/1977 | Austin | 219/10.79 X |
| 4,296,295 | 10/1981 | Kiuchi | 219/10.79 X |

Primary Examiner—C. C. Shaw
Assistant Examiner—Philip H. Leung
Attorney, Agent, or Firm—Wood, Dalton, Phillips, Mason & Rowe

[57] ABSTRACT

An induction heating coil for use in a cooking range or the like. The coil is defined by a flat spiral of electrically conducted wire having at least three radially related sections including a radially outermost section having closely spaced turns, a radially innermost section having closely spaced turns, and a radially intermediate section having widely spaced turns. In one form, the intermediate section turns are uniformly widely spaced. In another form, the intermediate section turns are arranged in widely spaced groups. The disclosed configurations provide a substantially uniform power transfer to the element being heated, such as a ferromagnetic utensil.

20 Claims, 7 Drawing Figures

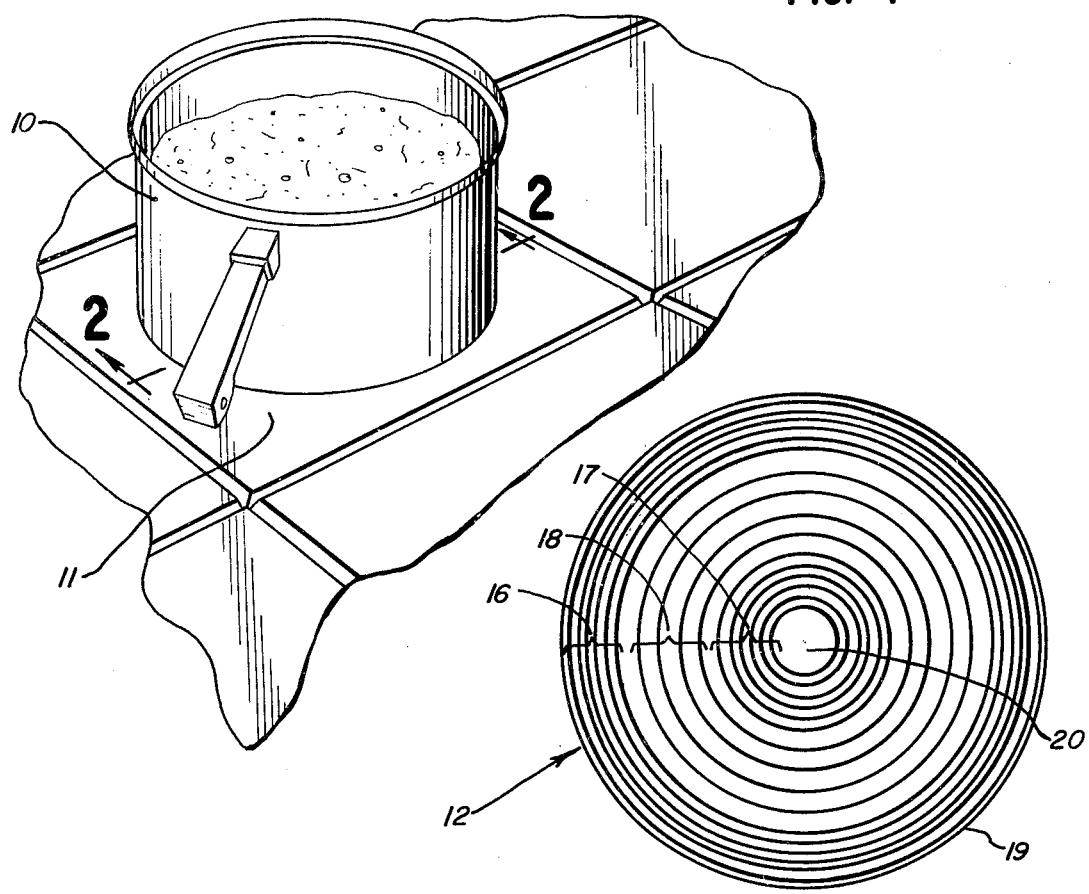
FIG. 1
FIG. 7
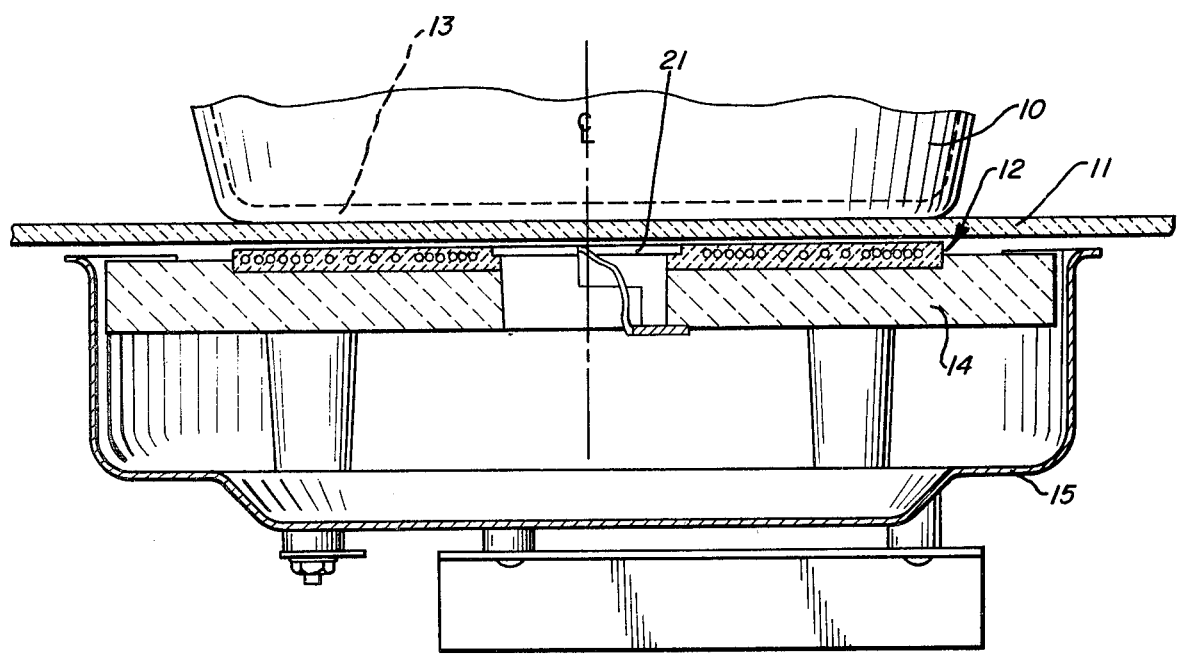
FIG. 2

INDUCTION HEATING COIL

BACKGROUND OF THE INVENTION

1. Field of the Invention

This invention relates to heating devices and in particular to an induction heating coil for use in heating a frerromagnetic utensil or the like.

2. Description of the Background Art

One form of cooktop for use in domestic ranges and the like comprises a magnetic induction cooktop wherein a work coil subjacent the smooth cooktop upper surface acts as a transformer primary coil in inducing secondary currents in an overlying ferrous utensil, or the like. A high frequency electric current passing through the work coil at about 25 kHz., produces a rapidly changing magnetic field. The electrical power input to the circuit which includes the work coil is in the range of 1000 to 2000 watts.

A serious problem has arisen, however, in the induction heating devices of the prior art in that nonuniform heating of the utensil occurs causing undercooking of portions of the food in the utensil and overcooking of other portions.

A number of different induction heating coil arrangements have been developed in an attempt to solve this vexatious problem. Thus, illustratively, Carl G. Eisen, in U.S. Pat. No. 2,751,480, discloses an induction heating coil having coil turns spaced relatively close together where thick sections are to be heated, and relatively far apart where thinner sections are to be heated.

Ronald J. Cunningham discloses in U.S. Pat. No. 3,843,857, an induction heating coil which is unsymmetrically arranged so that the amount of heating of a utensil placed thereon may be varied depending on the location at which the utensil is placed.

A work coil for use in an induction cooking appliance is disclosed in U.S. Pat. No. 4,029,926 of Buddy J. Austin, wherein the turns of the work coil are uniformly spaced.

An induction heating coil construction for use in a cooking appliance is disclosed in U.S. Pat. No. 4,296,295 of Mitsuyuki Kiuchi, wherein the work coil is constructed with relatively widely spaced turns adjacent the open center portion of the coil and closely spaced turns on the outer portion of the coil in an attempt to provide a more uniform heating over the total area of the bottom of the cooking utensil. However, it is apparent that this proposed solution to the problem is inadequate and therefore unsatisfactory in that there is no compensation provided for the open center portion of the work coil and therefore there would be a relatively cold zone near and around the center of the cooking utensil.

SUMMARY OF THE INVENTION

The present invention comprehends an improved induction heating coil for use in a cooking range or the like which provides substantially uniform heating of the coupled utensil.

More specifically, the invention comprehends providing the induction heating coil as a flat spiral of electrically conductive wire having at least three radially related sections including a radially outermost section having closely spaced turns, a radially innermost section having closely spaced turns, and a radially intermediate section having widely spaced turns or widely spaced groups of turns.

In the illustrative embodiment, the spacing of the radially outermost and radially innermost sections is similar.

In one form, the spacing of the turns of the intermediate section is uniform.

In another form, the intermediate section is defined by groups of closely spaced turns, with the groups being widely spaced.

In the illustrated embodiment, the coil is formed of Litz wire.

The spiral configuration, in the illustrated embodiment, defines an open center portion providing a space which may be utilized to accommodate a control device.

The induction heating coil of the present invention is extremely simple and economical of construction while yet providing an improved, uniform heat transfer to the cooking utensil, which is accomplished by the induced power density coupled to the cooking utensil load which is of substantially uniform distribution over the whole area of the work coil.

BRIEF DESCRIPTION OF THE DRAWING

Other features and advantages of the invention will be apparent from the following description taken in connection with the accompanying drawing wherein:

FIG. 1 is a fragmentary perspective view of a domestic cooking range utilizing an induction heating work coil embodying the invention;

FIG. 2 is a fragmentary vertical section taken substantially along the line 2—2 of FIG. 1;

FIG. 7 is a schematic plane view of the configuration of the coil of FIG. 2.

DESCRIPTION OF THE PREFERRED EMBODIMENTS

Figure 3:
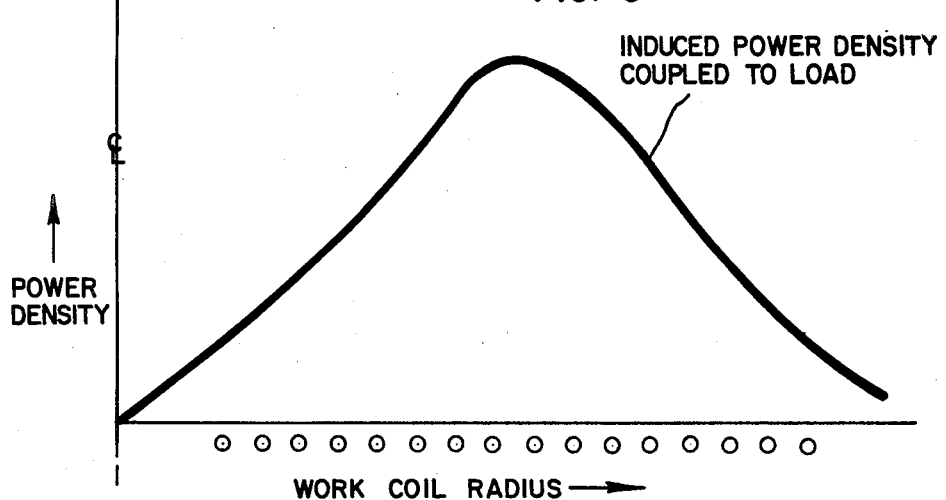
FIG. 3 is a diagram illustrating the distribution of the induced power density coupled to the load in the prior art induction coils utilizing uniform spacing between the turns of the coil.

In the illustrated embodiment of the invention as disclosed in FIG. 1 of the drawing, a cooking utensil 10 is caused to be heated by induction of secondary currents in the metallic material of the utensil when placed on a cooktop 11. The inductive heating is effected by the induced power coupled to the cooking utensil by an induction coil generally designated 12 disposed subjacent the cooktop 11, as seen in FIG. 2. The induction coil is energized with high frequency current to act as a transformer primary in inducing secondary heating currents in the ferromagnetic material of the utensil 10, and more specifically, in the bottom wall portion 13 thereof overlying the coil, as illustrated in FIG. 2. As shown, the coil is supported on an insulative base 14 mounted within a housing 15 so as to be disposed closely subjacent the cooktop wall 11 for optimum transfer of power to the utensil 10 in effecting the heating operation.

Figure 4:
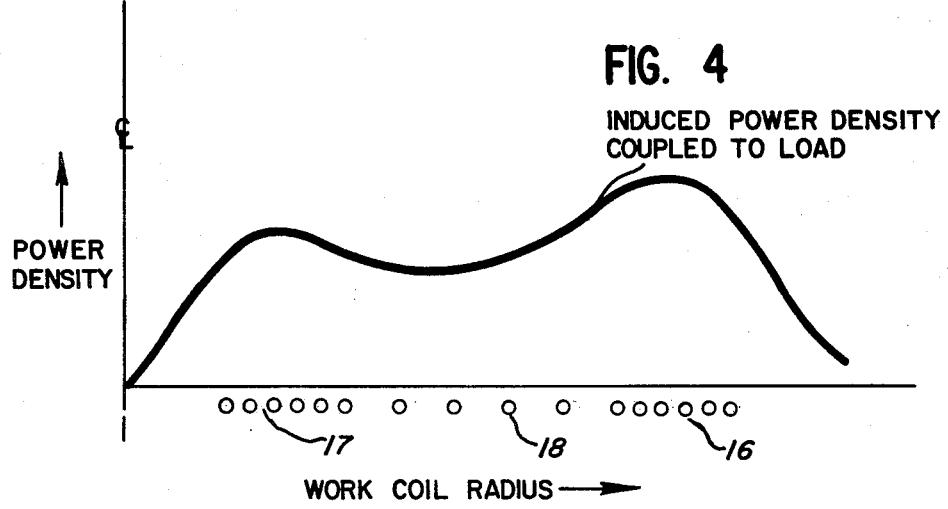
FIG. 4 is a diagram illustrating the distribution of the induced power density coupled to the load with a coil embodying the invention utilizing uniformly widely spaced turns of the intermediate coil section.

The improved uniform heating effected by coil 12 is effected by utilizing a novel arrangement of the turns of the coil, as illustrated in FIGS. 2, 4 and 7. More specifically, as shown therein, the coil turns are arranged in three radially related sections, including a radially outermost section 16, a radially inner section 17, and an intermediate section 18. The turns of the wire 19 in the outermost section 16 are relatively closely spaced, the turns of the wire in the intermediate section 18 are relatively widely spaced, and the turns of the wire in the innermost section 17 are again relatively closely spaced. Since the coil 12 has an open center portion the coil turns adjacent the open center portion are spaced close together to provide the desired power input density and distribution to the portion of the utensil over this area of the coil to compensate for the absence of coil turns in the open center portion of the coil. Such an arrangement of relatively loosely and tightly wound spiral sections have been found to produce an optimum uniformity in the applied power density input distribution to said utensil per unit of area and thus a like uniformity in the heating effect produced by the inductive coupling from the coil to the utensil bottom wall.

In the illustrated embodiment of FIGS. 2, 4 and 7, nominal work coil diameter 8", the wire 19 comprises a Litz wire having a cross-sectional area of approximately 0.033 cm². The outer section 16 comprises six turns of the wire having a spacing of approximately 2 mm. between adjacent turns, the intermediate section comprises four turns of the wire having a spacing of approximately 5 mm., and the innermost section 17 comprises six turns of the wire having a spacing of approximately 2 mm. Thus the spacing of the turns of the intermediate section is more than twice the spacing of the turns of the innermost and outer sections. Good results may also be obtained where the spacing of the turns of the intermediate section is approximately three times the spacing of the turns of the innermost and outer sections.

Figure 5:
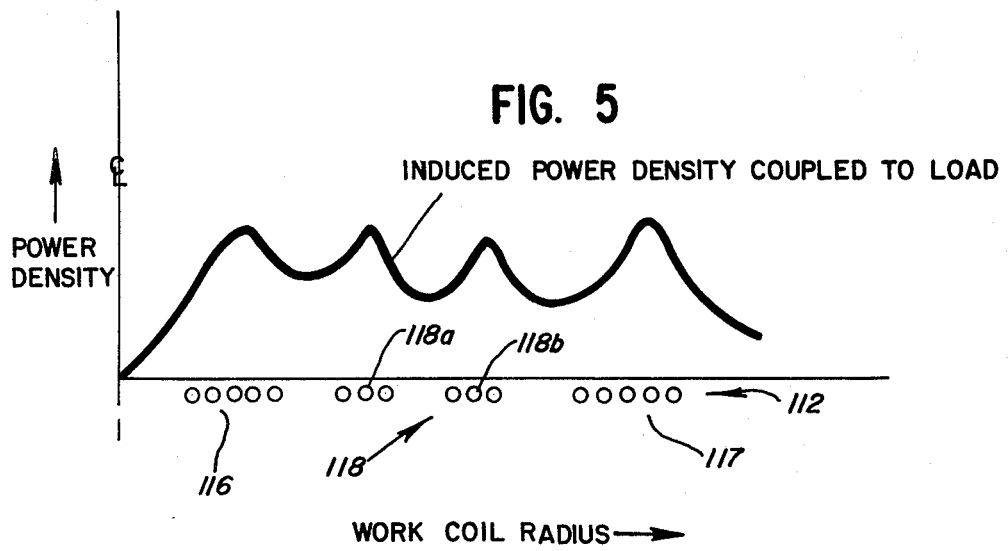
FIG. 5 is a diagram illustrating the distribution of the induced power density coupled to the load with a modified form of coil wherein the intermediate turns are arranged in widely spaced groups of closely spaced turns.

In the diagrams of FIGS. 3, 4 and 5 the coil turn spacing for the radius of each of the work coils is indicated on the horizontal axes of the diagrams, and the power density inputs to the utensil loads per unit of utensil bottom area are represented by coordinates along the vertical axes of the diagrams. The power density or energy distribution of the illustrative embodiment of FIGS. 1, 2 and 7 is illustrated in FIG. 4 and may be seen to be generally uniform over the area of the coil turns. In contrast, the heating effect produced by the conventional prior art inductive heating coil having uniformly spaced turns throughout is not uniform and peaks at the intermediate portion of the spiral as illustrated in FIG. 3, thus causing nonuniform heating of the utensil, with portions of the food being cooked adjacent the intermediate section of the coil being overheated while portions of the food adjacent the radially inner and outer sections of the coil being underheated.

As shown, the center 20 of the coil may be open. In the illustrated embodiment the open center portion, which includes no coil turns, has a radial extent substantially equal to one-third the total radial extent of all of the coil turns. Illustratively, a sensor 21 may be provided in the open center 20 of the coil, such as for sensing the presence of the utensil 10 for improved control of the use of the range.

Figure 6:
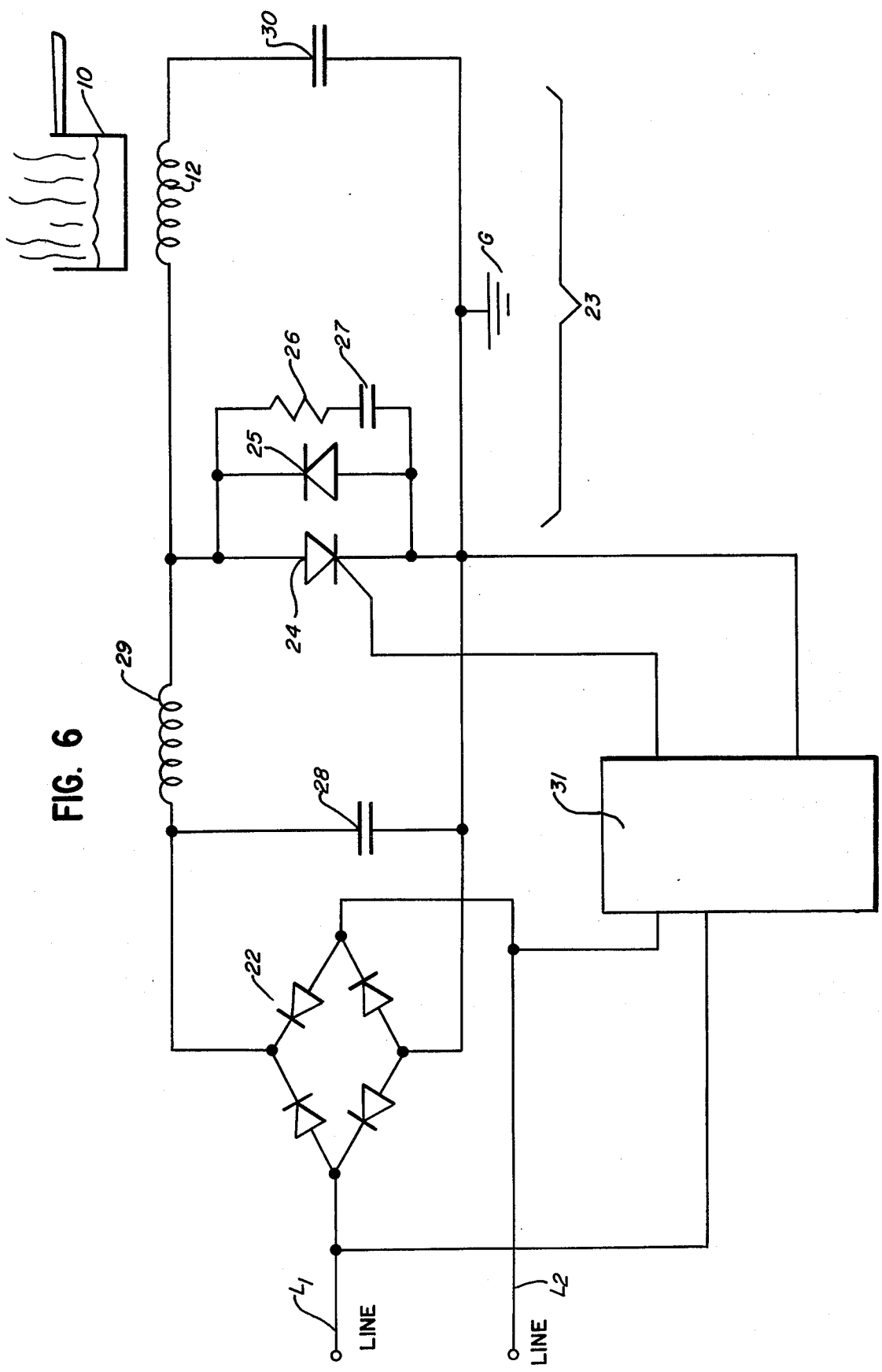
FIG. 6 is a schematic wiring diagram of the induction heating coil circuit.

The operation of the system is illustrated in FIG. 6 showing a simplified induction range circuit representative of the type of circuit in which the present invention may be employed, wherein the induction coil 12 is energized from the 120-volt AC power supply leads L1 and L2 through a bridge 22. The high frequency current is developed in a resonant circuit portion 23, which includes a power ASCR 24, a fast recovery diode 25 connected in parallel with the ASCR, and a series connection of a resistor 26 and capacitor 27 connected in parallel therewith. A filter capacitor 28 is connected across the bridge and a charging choke 29 is connected in series with the coil 12 from one side of the bridge. A resonating capacitor 30 is connected in series with coil 12 to the opposite side of the bridge and to ground G, as shown. A conventional control circuit 31 is connected to ASCR 24 for controlling the firing time thereof. The control circuitry is exemplary only and forms no part of the invention.

In broad aspect, the invention comprehends providing uniform induction heating of the utensil by a coil configuration wherein the outermost turns are relatively tightly wound, the innermost turns are relatively tightly wound, and the intermediate turns are relatively loosely wound. In manufacturing the work coil, the desired coil turn pattern and spacing may be printed in a suitable manner on a suitable substrate fixture. The insulated Litz wire to form the coil turns may then be glued to the substrate in the desired pattern and spacing after providing suitable lead wires for the coil. Conventional inorganic high temperature Sauereisen cement or other suitable cement may then be employed to cement the coil together into a flat circular integral pancake-shaped unit with the coil turns properly spaced one from another in the desired pattern. When the cement is hardened the finished coil may be removed from the substrate fixture. The specific embodiment discussed above has been found to provide a high degree of uniformity in such heating.

An alternate embodiment of the invention is illustrated in FIG. 5, wherein the intermediate section 118 of the turns defines groups 118a and 118b of closely spaced turns with the groups being widely spaced. As in the embodiment of FIG. 7, the outermost section 116 and the innermost section 117 are defined by relatively closely spaced turns.

The generally uniform heating effect produced by the modified form of induction heating coil 112 is further illustrated in FIG. 5. As shown, the induced power density coupled to the load curve is somewhat more rippled than the corresponding curve shown in FIG. 4 produced by the embodiment of FIGS. 2 and 7, but provides a substantially more uniform heating over the radial extent of the coil 112 than in the prior art structures illustrated in FIG. 3.

In each of the illustrations of diagrams 3–5, the coil turns shown are those of one radial extent from the centerline of the coil.

While the invention has been disclosed with the induction coils being formed of Litz wire, as will be obvious to those skilled in the art, the coils may be formed of wires having solid cross sections with some loss due to skim effect. In the illustrated embodiment, the Litz wire utilized was formed of 65 strands of #30 insulated wire.

The improved coil configuration has been found to be highly advantageously adapted for use in domestic range applications. The induction coil provides suitable inductance and power and uniform induced power density coupling to the utensil within the normal coil diameter range of approximately 6" to 8". The coil is advantageously adapted to carry the high current densities at the relatively high frequencies utilized, with low AC resistance. By providing substantially uniform power distribution in the utensil being heated, a substantial improvement in the cooking operation is obtained compared to the heating produced in the prior art structures, as discussed above.

The foregoing disclosure of specific embodiments is illustrative of the broad inventive concepts comprehended by the invention.

We claim:

1. In a cooking range or the like, an induction heating coil for use in heating a cooking utensil, said coil comprising
   a spiral of electrically conductive wire having at least three radially related sections including
   a radially outermost section having a plurality of closely spaced turns,
   a radially innermost section having a plurality of closely spaced turns, and
   a radially intermediate section having a plurality of turns more widely spaced than said radially outermost and radially innermost turns.

2. The induction heating coil of claim 1 wherein the spacing of the turns of said radially outermost section is substantially equal to the spacing of the turns of the radially innermost section.

3. The induction heating coil of claim 1 wherein the turns of said radially outermost section are substantially uniformly spaced.

4. The induction heating coil of claim 1 wherein the turns of said radially innermost section are substantially uniformly spaced.

5. The induction heating coil of claim 1 wherein the turns of said radially intermediate section are substantially uniformly spaced.

6. The induction heating coil of claim 1 wherein the spacing of the turns of said intermediate section is at least approximately twice that of the widest spacing of the other turns.

7. The induction heating coil of claim 1 wherein the spacing of the turns of said intermediate section is approximately three times that of the widest spacing of the other turns.

8. In a cooking range on the like, an induction heating coil for use in heating a cooking utensil, said coil comprising
   a spiral of electrically conductive wire having at least three radially related sections including
   a radially outermost section having a plurality of closely spaced turns,
   a radially innermost section having a plurality of closely spaced turns, and
   a radially intermediate section having groups of pluralities of turns more widely spaced than said radially outermost and radially innermost turns.

9. The induction heating coil of claim 8 wherein the turns in each of said groups of turns of said radially intermediate section are uniformly spaced.

10. The induction heating coil of claim 8 wherein the turns in each of said groups of turns of said radially intermediate section are closely spaced.

11. The induction heating coil of claim 8 wherein each of said groups comprises approximately three turns.

12. The induction heating coil of claim 8 wherein each of the radially outermost turns, radially innermost turns, and the turns of said groups are similarly closely spaced.

13. In a cooking range or the like, an induction heating coil for use in heating a cooking utensil, said coil comprising
   a flat spiral of electrically conductive, approximately 0.033 $cm^2$ cross section Litz wire having at least three radially related sections including
   a radially outermost section having approximately 6 spaced turns,
   a radially innermost section having approximately 6 spaced turns and defining an open center portion, and
   a radially intermediate section having approximately 4 turns more widely spaced than said radially outermost and radially innermost turns.

14. The induction heating coil of claim 13 wherein said radially outermost turns are spaced approximately 2 mm. apart.

15. The induction heating coil of claim 13 wherein said radially innermost turns are spaced approximately 2 mm. apart.

16. The induction heating coil of claim 13 wherein said radially intermediate turns are spaced approximately 5 mm. apart.

17. The induction heating coil of claim 13 wherein said open center portion has a radial extent substantially equal to one-third the total radial extent of said turns.

18. In a cooking range or the like, an induction heating coil for use in heating a cooking utensil, said coil comprising
   a flat spiral of electrically conductive wire having an open center portion, a radially outer section having a plurality of spaced coil turns, and a radially inner section having a plurality of coil turns, said radially inner section turns being more closely spaced than said outer section turns to compensate for the lack of coil turns in said open center portion to provide a substantially uniform power density input distribution to said utensil per unit of area.

19. The induction heating coil of claim 18 wherein said radially inner section turns are spaced less than one-half as far apart as said outer section turns.

20. The induction heating coil of claim 19 wherein said open center portion has a radial extent substantially equal to one-third the total radial extent of said turns.

* * * * *

UNITED STATES PATENT AND TRADEMARK OFFICE
CERTIFICATE OF CORRECTION

PATENT NO. : 4,453,067

DATED : June 5, 1984

INVENTOR(S) : Joseph Karklys, et al.

It is certified that error appears in the above-identified patent and that said Letters Patent is hereby corrected as shown below:

Claim 8, line 1 (col. 5), after "range" cancel "on" and substitute therefor --or-- .

Signed and Sealed this

Third Day of December 1985

[SEAL]

Attest:

DONALD J. QUIGG

Attesting Officer

Commissioner of Patents and Trademarks